Sept. 23, 1969 P. H. BARRY ET AL 3,468,491

TAPE SUPPLY CABINET

Filed April 29, 1968

INVENTORS
PHILIP H. BARRY
RICHARD F. VEE
BY Michael A. O'Neil
ATTORNEY

United States Patent Office 3,468,491
Patented Sept. 23, 1969

3,468,491

TAPE SUPPLY CABINET

Philip H. Barry, Elk Grove Village, and Richard F. Vee, Chicago, Ill., assignors to Teletype Corporation, Skokie, Ill., a corporation of Delaware Filed Apr. 29, 1968, Ser. No. 725,061
Int. Cl. G03b *1/04*; B65h *75/14*
U.S. Cl. 242—71.1 11 Claims

ABSTRACT OF THE DISCLOSURE

A tape cabinet having a hinged door and a plate that can be positioned in two planes parallel to the door for supporting tapes of several widths. The tape-supporting hub includes a tape roll engaging surface to prevent the rolls from rocking during unwinding.

BACKGROUND OF THE INVENTION

The telegraph industry employs devices that record data on and transmits data from tapes of various widths. Accordingly, if the expense of furnishing tape supply equipment for use with each width of tape employed in the industry is to be avoided it is necessary to provide tape supply equipment capable of housing and positioning tapes of different widths.

SUMMARY OF THE INVENTION

According to one aspect of the invention, a tape storage cabinet comprises a normally closed door and a plate cooperating with the door to define the width of the cabinet. Means for positioning the plate in at least two planes extending parallel to the door when closed with the plate being closer to the door in one position than when it is in the other, enable cabinet width adjustment for efficient handling of taps of different widths.

In another aspect of the invention an anti-rock hub for use in a tape supply cabinet is provided. It comprises a first surface for supporting rolls of tape to be unwound and a second surface positioned for engagement with the rolls when the rolls are rocked by unwinding forces, thereby to prevent excessive rocking motion.

DESCRIPTION OF THE DRAWING

A more complete understanding of the invention may be had by referring to the following detailed description when taken in conjunction with the drawing wherein.

DETAILED DESCRIPTION

Figure 2:
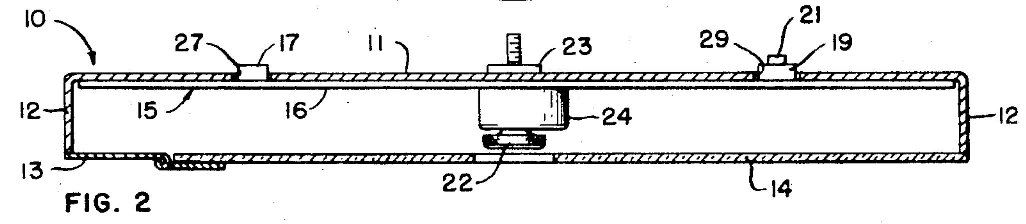
FIGURE 2 is a sectional view taken generally along the line 2—2 in FIGURE 1 in the direction of the arrows showing the spacer mechanism of the device in a first position.

Referring now to the drawing, wherein like reference numerals designate like parts throughout the several views, and referring particularly to FIGURE 2 thereof, there is shown a tape supply cabinet 10 comprised of a rear plate 11 that serves as a frame for the cabinet 10, a generally cylindrical side plate 12 that extends perpendicularly from the rear plate 11 around substantially the entire periphery thereof, a front plate 13 that extends perpendicularly from the side plate 12 parallel to the rear plate 11 and a door 14 that is hingedly supported on the front plate 13 for movement from the position shown in the drawing wherein it extends parallel to the rear plate 11 to a position wherein it extends perpendicularly with respect thereto.

The cabinet 10 may be supported in any desired position by attaching suitable supports to the rear plate 11. Suitable springs and latches may be provided for the door 14 as required.

Figure 1:
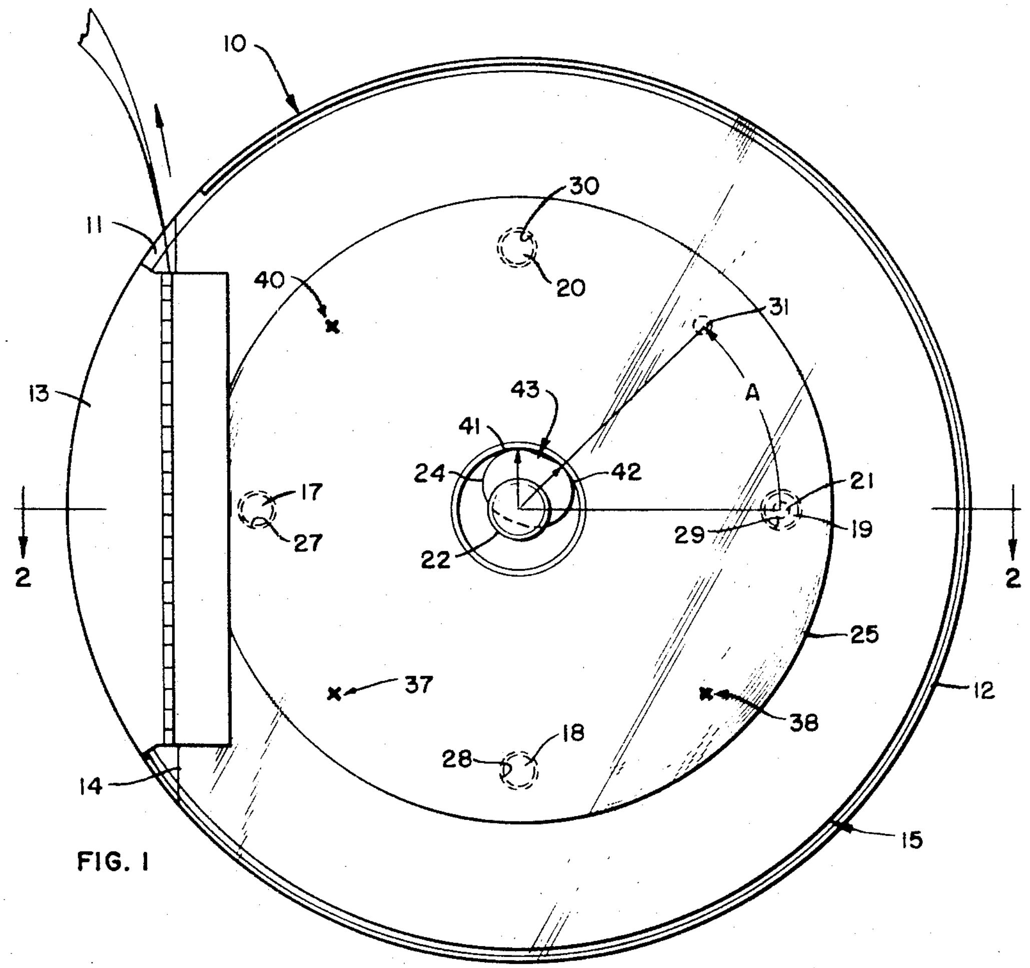
FIGURE 1 is a front view of a tape supply cabinet employing the present invention.

A spacer mechanism 15 is positioned within the cabinet 10 to vary the width of the cabinet 10. The spacer mechanism 15 includes a spacer plate 16 that has a generally circular configuration the outside dimensions of which are approximately equal to the inside dimensions of the side plate 12 and that cooperates with the door 14 to define the width of the cabinet 10. The spacer plate 16 is positioned with respect to the door 14 by four spacer plugs or disks 17, 18, 19 and 20 that, as is best shown in FIGURE 1, are positioned at approximately equally spaced intervals around the spacer plate 16 and that are similar except for the disk 19 which has a locating button 21 extending from it. The plate 16 is attached to the cabinet 10 by a knurled screw 22 that extends through the spacer plate 16 and the rear plate 11 into threaded engagement with a nut 23. An anti-rock hub 24 is attached to the spacer plate 16 for supporting rolls of tape, such as the roll of tape 25 shown in FIGURE 1, within the cabinet 10.

In use, the knurled screw 22 is loosened to allow the positioning of the spacer plate 16 with respect to the rear plate 11 to be varied. If it is desired to support relatively wide rolls of tape within the cabinet 11 the spacer plugs or disks 17, 18, 19 and 20 are mated with four holes 27, 28, 29 and 30 in the rear plate 11 and the spacer plate 16 moved into engagement with the rear plate 11 thereby positioning the spacer plate 16 in a first position with respect to the door 14. The knurled screw 22 is then tightened thereby securing the spacer plate 16 in the position shown in FIGURE 2.

Figure 3:
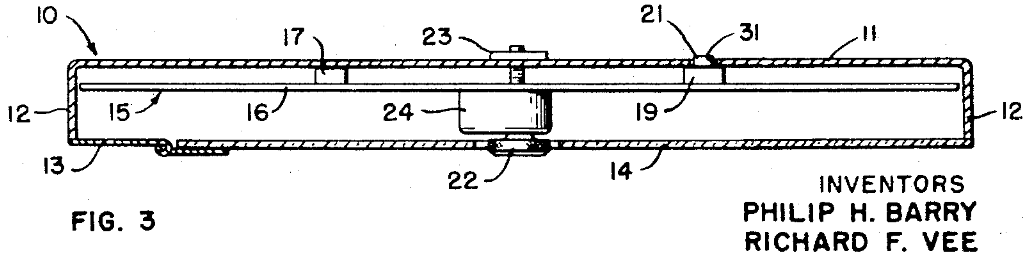
FIGURE 3 is a view similar to FIGURE 2 showing the spacer mechanism of the device in a different position.

If it is desired to support relatively narrow widths of tape in the cabinet 10 the knurled screw 22 is loosened and the spacer plate 16 is rotated through the angle A shown in FIGURE 1 to bring the locating button 21 of the spacer disk 19 into engagement with the small diameter locating hole 31 in the rear plate 11. The locating button 21 is inserted in the locating hole 31 and the knurled screw 22 is tightened thereby securing the spacer plate 16 in the position shown in FIGURE 3. This positions the spacer plate 16 in a second position with respect to the door 14 in which position the spacer plugs 17, 18 and 20 are positioned in engagement with the rear plate 11 at the positions 37, 38 and 40 shown in FIGURE 1.

The anti-rock hub 24 is specially shaped to prevent large diameter rolls of the relatively wide tape that is housed in the cabinet 10 when the spacer plate 16 is in the position shown in FIGURE 2 from rocking with respect to the cabinet 10 at the end of tape pulling or unwinding operations. As is best shown in FIGURE 1, the anti-rock hub 24 includes a tape roll supporting surface 41 which is positioned to support rolls of tape when no tape is being unwound therefrom. The hub 24 also includes a tape roll engaging surface 42 which is positioned out of engagement with rolls of tape when tape is not being unwound from the rolls and which is positioned for engagement with rolls of tape when tape is being unwound from the rolls. This engagement is caused by rocking or tilting forces that are applied to rolls of tape positioned on the hub 24 by tape unwinding devices which pull upon lengths of tape extending from the rolls of tape supported on the hub 24. The engagement of the surface 42 with the rolls serves to prevent rocking motion of the rolls upon the termination of pulling operations by preventing excessive rocking motion during pulling operations. That is, by preventing excessive clockwise rocking about the hub 24 of rolls of tape during pulling operations the surface 42 serves to lessen the amount of counterclockwise rocking that takes place at the end of pulling operations. The tape roll supporting surface 41 and the tape roll engaging surface 42 of the hub 24 are separated by a cutaway area 43 of the hub 24 that does not engage rolls of tape positioned on the hub at any time.

Although only one embodiment of the invention is shown in the drawings and described in the foregoing specification it will be understood that the invention is not limited to that specific embodiment but is capable of modification, rearrangement and substitution of parts and elements without departing from the scope of the invention.

We claim:

1. A tape storage cabinet comprising:

a door normally positioned in a closed position;

a plate for cooperation with the door to define the width of the cabinet; and means for positioning the plate in at least two planes each extending parallel to the door when the door is in the closed position and one positioned farther from the door than the other.

2. The storage cabinet according to claim 1 wherein the positioning means includes:

a frame having at least one aperture formed in it, and spacer means mounted on the plate for engagement with the frame to position the plate in one of the planes and for engagement with the aperture to position the plate in the other of the planes.

3. The tape storage cabinet according to claim 2 further including at least one side member extending perpendicularly from the frame and means for hingedly supporting the door on the side member.

4. The tape storage cabinet according to claim 3 further including a hub positioned on the plate for supporting rolls of tape in the cabinet and comprising a first surface for supporting the rolls and a second surface positioned for engagement with the rolls as tape is unwound therefrom to prevent the rolls from rocking with respect to the hub.

5. In a tape storage cabinet of the type including a frame plate, a side member extending from the frame plate and a door hingedly supported on the side member for cooperation with the side member and the frame plate to form a closed cabinet, the combination with the frame plate of:

a plate positioned within the cabinet for cooperation with the door to define the width of the cabinet, and means for positioning the plate in at least two positions with respect to the frame plate thereby providing a cabinet for at least two widths of tape.

6. The combination according to claim 5 wherein the positioning means includes spacer means positioned between the frame plate and the plate positioned within the cabinet and means for cooperation with the spacer means for positioning the plate positioned within the cabinet in engagement with the frame plate.

7. The combination according to claim 5 wherein the positioning means includes a plurality of spacer plugs positioned on one of the plates for engagement with the other of the plates to position the width defining plate in one of the positions and a plurality of apertures formed in the other of the plates for receiving the spacer plugs to position the width defining plate in the other of the positions.

8. An anti-rock hub for use in tape supply cabinets and the like including a first surface for supporting rolls of tape to be unwound and a second surface positioned for engagement with the rolls when the rolls are rocked by unwinding forces to prevent excessive rocking motion.

9. The hub according to claim 8 wherein the surfaces are separated by a cutaway portion of the hub.

10. The hub according to claim 9 wherein the surfaces comprise portions of convex shaped portions of the hub and wherein the cutaway portion is a concave shaped portion positioned therebetween.

11. In a tape supply cabinet of the type comprising a rear plate, a side wall extending perpendicularly from the rear plate and a door pivotally supported on the side wall, a device for varying the width of the cabinet with respect to the door comprising:

a spacer plate positioned within the cabinet;

spacer means mounted on the spacer plate for engagement with the rear wall of the cabinet to position the spacer plate in a first position with respect to the door, and means for positioning the spacer plate in engagement with the rear plate thereby to position the spacer plate in a second position with respect to the door.

References Cited

UNITED STATES PATENTS

| | | | |
|---|---|---|---|
| 1,871,235 | 8/1932 | Proctor et al. | 242—71.1 |
| 3,333,687 | 8/1967 | Badgett. | |

NATHAN L. MINTZ, Primary Examiner

U.S. Cl. X.R.

206—52